(12) United States Patent
Kato

(10) Patent No.: US 11,135,739 B2
(45) Date of Patent: Oct. 5, 2021

(54) MANUFACTURING METHOD OF HONEYCOMB STRUCTURE

(71) Applicant: NGK INSULATORS, LTD., Nagoya (JP)

(72) Inventor: Daiki Kato, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 272 days.

(21) Appl. No.: 16/040,893

(22) Filed: Jul. 20, 2018

(65) Prior Publication Data

US 2019/0030752 A1 Jan. 31, 2019

(30) Foreign Application Priority Data

Jul. 31, 2017 (JP) .............................. JP2017-148146

(51) Int. Cl.
*B28B 3/20* (2006.01)
*C04B 38/00* (2006.01)
(Continued)

(52) U.S. Cl.
CPC ............ *B28B 3/20* (2013.01); *B01D 46/0001* (2013.01); *B01D 46/2451* (2013.01);
(Continued)

(58) Field of Classification Search
None
See application file for complete search history.

(56) References Cited

U.S. PATENT DOCUMENTS

| 7,413,625 B2 * | 8/2008 | Fujita | ................. B01D 46/0001 156/312 |
| 8,394,220 B2 * | 3/2013 | Kamei | .................... B01J 35/04 156/89.11 |

(Continued)

FOREIGN PATENT DOCUMENTS

| JP | 2001/130973 | * | 8/1999 | ........... C04B 35/565 |
| JP | 2000-007455 A1 | | 1/2000 | |

(Continued)

OTHER PUBLICATIONS

JP-2001/130,973 (Kasai) Aug. 1999 (online machine translation), [Retrieved on Mar. 17, 2020]. Retrieved from: Espacenet (Year: 1999).*

(Continued)

*Primary Examiner* — Alison L Hindenlang
*Assistant Examiner* — Andrés E. Behrens, Jr.
(74) *Attorney, Agent, or Firm* — Burr & Brown, PLLC

(57) ABSTRACT

A manufacturing method of a honeycomb structure including:

a formed body forming step of extruding a forming raw material, to form a plurality of quadrangular prismatic columnar honeycomb formed bodies;

a firing step of firing the honeycomb formed bodies, to form a plurality of quadrangular prismatic-columnar quadrangular segments;

a triangular segment forming step to form a triangular prismatic-columnar triangular segment;

a bonded body forming step to form a honeycomb bonded body; and a circumference grinding step to manufacture the honeycomb structure, wherein the bonded body forming step further includes:

a pressurizing step of pressurizing the triangular segment from a circumferential direction of the temporary assembly toward a central direction thereof, by use of a pressurizing jig comprising a pressurizer.

5 Claims, 7 Drawing Sheets

(51) Int. Cl.
*B01D 46/24* (2006.01)
*C04B 37/00* (2006.01)
*B28B 3/26* (2006.01)
*B28B 1/00* (2006.01)
*B01D 46/00* (2006.01)
*B01J 35/04* (2006.01)
*C04B 33/30* (2006.01)
*C04B 33/20* (2006.01)
*C04B 33/02* (2006.01)
*C04B 33/04* (2006.01)
*C04B 111/00* (2006.01)

(52) U.S. Cl.
CPC .......... *B01D 46/2455* (2013.01); *B01J 35/04* (2013.01); *B28B 1/002* (2013.01); *B28B 3/269* (2013.01); *C04B 37/003* (2013.01); *C04B 37/005* (2013.01); *C04B 38/0016* (2013.01); *B01D 2046/2477* (2013.01); *B01D 2046/2481* (2013.01); *B28B 2003/203* (2013.01); *C04B 2111/00793* (2013.01); *C04B 2235/77* (2013.01); *C04B 2237/341* (2013.01); *C04B 2237/365* (2013.01)

(56) References Cited

U.S. PATENT DOCUMENTS

| | | | |
|---|---|---|---|
| 2005/0076626 A1 | 4/2005 | Kudo et al. | |
| 2005/0166729 A1 | 8/2005 | Nishio et al. | |
| 2007/0199205 A1* | 8/2007 | Hoshino | C04B 38/0016 34/437 |
| 2011/0240205 A1* | 10/2011 | Kamei | C04B 38/0019 156/89.11 |
| 2017/0057196 A1* | 3/2017 | Mori | B32B 3/12 |

FOREIGN PATENT DOCUMENTS

| | | | |
|---|---|---|---|
| JP | 2011/212512 | * 1/2000 | ............ C04B 37/00 |
| JP | 2003-291054 A1 | 10/2003 | |
| JP | 2009-050849 A1 | 3/2009 | |
| JP | 2011-212512 A | 10/2011 | |
| JP | 5097237 B2 | 12/2012 | |

OTHER PUBLICATIONS

JP-2011/212,512 (Tadashi) Jan. 2000 (human translation), [Retrieved on Jul. 9, 2020]. Retrieved from: STIC (Year: 2000).*
Japanese Office Action (with English translation), Japanese Application No. 2017-148146, dated Apr. 7, 2020 (6 pages).

* cited by examiner

MANUFACTURING METHOD OF HONEYCOMB STRUCTURE

"The present application is an application based on JP-2017-148146 filed on Jul. 31, 2017 with Japan Patent Office, the entire contents of which are incorporated herein by reference."

BACKGROUND OF THE INVENTION

Field of the Invention

The present invention relates to a manufacturing method of a honeycomb structure, and more particularly, it relates to a manufacturing method of a honeycomb structure in which a plurality of honeycomb segments can be combined to form a honeycomb block body having a shape stability.

Description of the Related Art

In various industrial technology fields of cars, chemistry, electric power, irons and steels, and others, honeycomb structures made of ceramics and excellent in heat resistance, durability and the like are often employed as a catalyst carrier for a catalyst device and a filter which are used for environmental measures, collection of specific substances, and the like. Particularly in recent years, a plugged honeycomb structure has been manufactured in which cell open ends at both ends are alternately plugged, and has been used as a diesel particulate filter (DPF) to trap fine particulate matter (PM) emitted from a diesel engine or the like. As a material of the above honeycomb structure for use at high temperatures and under an atmosphere of a corrosive gas, there is suitably used a ceramic material of silicon carbide (SiC), cordierite, aluminum titanate (AT) or the like which is excellent in heat resistance and chemical stability.

It is known that silicon carbide in the above ceramic materials has a comparatively high thermal expansion coefficient. Therefore, in a large honeycomb structure in which silicon carbide is used in aggregates and a honeycomb diameter is large, defects such as cracks are easily generated due to thermal shock applied to the honeycomb structure during use. Furthermore, in a firing step of firing a honeycomb formed body at a high firing temperature, there is a high possibility that defects such as deformation and cracks (firing cracks) of partition walls are generated due to a temperature difference between a formed body inner portion of the honeycomb formed body and a circumferential surface thereof (the temperature difference between the inside and the outside). To eliminate the above disadvantage, a time taken in a degreasing step, a main firing step or the like for the large honeycomb structure might be longer than that for a usual honeycomb structure whose honeycomb diameter is smaller. Consequently, there is the problem that a manufacturing time of the honeycomb structure lengthens, thereby decreasing a manufacturing efficiency.

To eliminate the problem, when the large honeycomb structure is manufactured, for example, a plurality of quadrangular prismatic columnar honeycomb segments (honeycomb fired bodies) are previously formed, these honeycomb segments are combined and bonded by using a bonding material to form a large honeycomb bonded body (a honeycomb block body), and then a circumference of the honeycomb bonded body is roughly processed and ground, to manufacture the honeycomb structure having a desirable shape such as a round pillar shape (see Patent Document 1).

It is to be noted that as the honeycomb segments, plugged honeycomb segments including a plurality of plugging portions are used sometimes.

On the other hand, there has been suggested a honeycomb structure manufactured by arranging triangular prismatic columnar honeycomb segments (hereinafter referred to simply as "triangular segments") in portions corresponding to "corners" in a cross section of a formed honeycomb bonded body (hereinafter referred to as "a bonded body cross section") which is perpendicular to a central axis (a honeycomb axis), when a plurality of quadrangular prismatic columnar honeycomb segments (hereinafter referred to simply as "quadrangular segments") are bonded (see Patent Documents 2 and 3).

However, in the case of the honeycomb structure described in Patent Document 1, when the circumference of the honeycomb bonded body is ground and processed in a round shape, an elliptic shape or the like, almost all quadrangular segments arranged in "the corners" of the honeycomb structure are scraped off, thereby causing the problem that a raw material yield of the whole honeycomb structure decreases.

On the other hand, in the honeycomb structures described in Patent Documents 2 and 3, the decrease of the above raw material yield can be eliminated, but an assembling operation of combining the plurality of quadrangular and triangular segments to form a honeycomb bonded body might become difficult. Specifically, when the plurality of segments is bonded, it is necessary to hold, until the bonding material dries, a state where the honeycomb bonded body is pressurized from a circumferential direction toward the center of a honeycomb cross section while the bonding material is applied to a space among the respective segments.

In this case, it is difficult to pressurize the triangular segments arranged in the corners with a stabilized force, and a width of the bonding material between the respective segments (the width of a bonding layer) might not become constant. Consequently, a shape stability might be impaired. For example, the overall shape of the honeycomb bonded body collapses.

Therefore, in the case of forming the honeycomb bonded body in which the triangular segments are arranged in the corners, there has been suggested a method of preparing a tubular auxiliary member made of aluminum or aluminum alloy and having the same shape as a sectional shape of a triangular segment, attaching oblique sides of the triangular segment and the auxiliary member to each other to form a quadrangular prismatic columnar pseudo honeycomb segment (a pseudo segment), and arranging such pseudo segments in the corners to form a honeycomb bonded body (see Patent Document 4).

In consequence, when a plurality of segments are combined to form one honeycomb bonded body, the stabilized force is applicable from the circumferential direction, the width of the bonding material can be adjusted to be constant, and occurrence of the disadvantage that the shape collapses as described above can be eliminated.

Afterward, the auxiliary member is removed from each pseudo segment, and the circumferential surface of the obtained honeycomb bonded body is, for example, ground and processed, so that the honeycomb structure having an arbitrary shape can be manufactured. Additionally, the honeycomb bonded body is dried in a state where the auxiliary members are attached, and then the auxiliary members are removed. Therefore, it is possible to produce an effect that generation of bonding shift among the respective segments can be inhibited. Furthermore, by use of a material made of a metal such as aluminum, a heat capacity of the auxiliary member can be suppressed, and a thermal conductivity can be heightened. In consequence, a temperature rise rate during drying can increase. For example, it is possible to shorten a drying time.

[Patent Document 1] JP-A-2003-291054
[Patent Document 2] JP-A-2000-7455
[Patent Document 3] JP-A-2009-50849
[Patent Document 4] JP 5097237

SUMMARY OF THE INVENTION

As described above, in a manufacturing method of a honeycomb structure in which an auxiliary member is used as disclosed in Patent Document 4, an amount of a circumferential portion to be ground by grind processing is suppressed, thereby enabling improvement of a raw material yield. Furthermore, triangular segments can be pressurized with a stabilized force, and hence a width of a bonding layer between the segments can be adjusted to be constant. Consequently, the method has excellent characteristics. For example, it is possible to form a honeycomb bonded body having an excellent shape stability.

However, the method requires a step of attaching the auxiliary members to the triangular segments arranged in "corners" to form a pseudo segment and a step of only removing the auxiliary members from the pseudo segments after the segments are bonded, and these operations require a time. Consequently, there is still a risk that a manufacturing efficiency decreases. Furthermore, an excessive burden might be imposed on an operator to carry out such operations. Additionally, there has been the problem that new material cost for the auxiliary member itself or, for example, an attaching agent to attach the triangular segments to the auxiliary members is required to increase manufacturing cost of the honeycomb structure.

Therefore, the present invention has been developed in view of the above actual circumstances, and an object of the present invention is to provide a manufacturing method of a honeycomb structure in which it is possible to form a honeycomb bonded body including triangular segments arranged in corners and having an excellent shape stability without requiring any auxiliary members and in which there is not a problem such as rise of manufacturing cost.

To achieve the above-mentioned object, according to the present invention, there is provided a manufacturing method of a honeycomb structure as follows.

According to a first aspect of the present invention, a manufacturing method of a honeycomb structure is provided including a formed body forming step of extruding a forming raw material, to form a plurality of quadrangular prismatic columnar honeycomb formed bodies which have partition walls to define a plurality of cells forming through channels for a fluid and extending from one end face to the other end face and in which a formed body cross section perpendicular to a central axis is rectangular; a firing step of firing the honeycomb formed bodies, to form a plurality of quadrangular prismatic-columnar quadrangular segments; a triangular segment forming step of cutting parts of the formed quadrangular segments along a diagonal line in a quadrangular cross section perpendicular to the central axis and in parallel with the central axis, to form a triangular prismatic-columnar triangular segment which has a first side surface, a second side surface perpendicular to the first side surface, and an oblique side surface to couple side ends of the first side surface and the second side surface with each other and in which a triangular cross section perpendicular to the central axis is right-angled triangular; a bonded body forming step of disposing the triangular segment in a corner so that the oblique side surface becomes an outermost circumference and so that the residual first and second side surfaces face segment side surfaces of the quadrangular segments, respectively, to construct a temporary assembly in which a plurality of triangular segments and the quadrangular segments are combined, and interposing a bonding layer between the triangular segment and the quadrangular segment and between the quadrangular segments, to form a honeycomb bonded body; and a circumference grinding step of drying the obtained honeycomb bonded body, and then grinding and processing a circumferential surface of the honeycomb bonded body, to manufacture the honeycomb structure having a desirable shape, and the bonded body forming step further includes a pressurizing step of pressurizing the triangular segment from a circumferential direction of the temporary assembly toward a central direction thereof, by use of a pressurizing jig including a pressurizer which has a cross section having a shape analogous to that of the triangular cross section and a pressurizing oblique side surface abuttable on the oblique side surface, and a pressurizer driving portion which moves the pressurizer along a pressurizing direction perpendicular to the first side surface or the second side surface to pressurize the triangular segment in a state where the pressurizing oblique side surface abuts on the oblique side surface.

According to a second aspect of the present invention, the manufacturing method of the honeycomb structure according to the above first aspect is provided, wherein the pressurizing jig further includes a movement regulating portion which abuts on the triangular segment and the quadrangular segment from a direction perpendicular to the pressurizing direction, to regulate movements of the triangular segment and the quadrangular segment from the central direction of the temporary assembly to the circumferential direction thereof.

According to a second aspect of the present invention, the manufacturing method of the honeycomb structure according to the above first or second aspects is provided, wherein in the pressurizing step, at least a pair of pressurizing jigs are used, the triangular segment is pressurized in a first pressurizing direction by a first pressurizer of one of the pressurizing jigs, and the triangular segment is pressurized in a second pressurizing direction perpendicular to the first pressurizing direction by a second pressurizer of the other pressurizing jig.

According to a second aspect of the present invention, the manufacturing method of the honeycomb structure according to any one of the above first to third aspects is provided, wherein the pressurizing jig further includes a swinging mechanism portion which swings the pressurizer in a direction perpendicular to the pressurizing direction.

According to a second aspect of the present invention, the manufacturing method of the honeycomb structure according to any one of the above first to fourth aspects is provided, wherein the pressurizing jig includes a plurality of pressurizer driving portions, to independently drive a plurality of pressurizers attached to the pressurizer driving portions, respectively.

According to a manufacturing method of a honeycomb structure of the present invention, it is possible to form a honeycomb bonded body including triangular segments arranged in corners and having an excellent shape stability, and it is possible to manufacture the honeycomb structure having a suitable shape from the honeycomb bonded body.

In particular, for example, auxiliary members are not required, and hence the manufacturing method of the honeycomb structure does not become complicated and does not impose an excessive burden on an operator.

Furthermore, it is possible to manufacture the honeycomb structure which maintains a high raw material yield and suppresses manufacturing cost.

DESCRIPTION OF THE PREFERRED EMBODIMENTS

Figure 1:
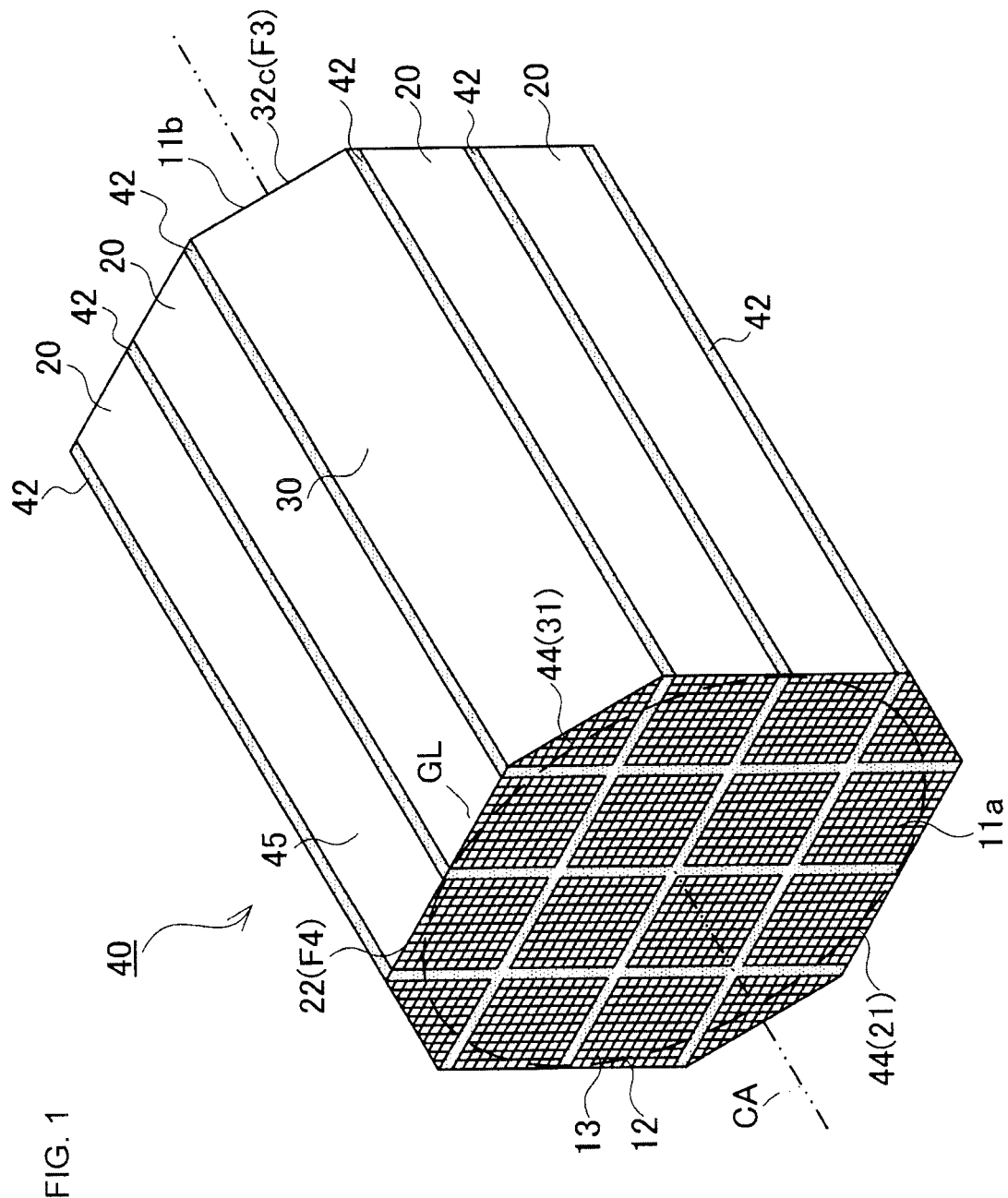
FIG. 1 is a perspective view schematically showing an example of a honeycomb bonded body formed in a bonded body forming step of a manufacturing method of a honeycomb structure of the present embodiment.

Hereinafter, description will be made as to embodiments of a manufacturing method of a honeycomb structure of an embodiment of the present invention with reference to the drawings. It is to be noted that the manufacturing method of the honeycomb structure of the present invention is not limited to the following embodiments, and various design changes, modifications, improvements and others are addable without departing from the gist of the present invention.

The manufacturing method of the honeycomb structure of the embodiment of the present invention is essentially constituted of a formed body forming step of forming a plurality of quadrangular prismatic columnar honeycomb formed bodies 10, a firing step of firing the honeycomb formed bodies 10 to form a plurality of quadrangular prismatic-columnar quadrangular segments 20 (honeycomb fired bodies), a triangular segment forming step of forming a triangular segment 30 from the quadrangular segment 20, a bonded body forming step of combining the plurality of quadrangular segments 20 and a plurality of triangular segments 30 to form a honeycomb bonded body 40, and a circumference grinding step of grinding and processing the honeycomb bonded body 40 to manufacture the honeycomb structure.

Here, the formed body forming step is a step of extruding a forming raw material (not shown) to form the plurality of quadrangular prismatic columnar honeycomb formed bodies 10 (see FIG. 2) which have latticed partition walls 13 to define a plurality of cells 12 forming through channels for a fluid and extending from one end face 11a to the other end face 11b and in which a formed body cross section 14 perpendicular to a central axis CA is rectangular.

In the cells 12 and the partition walls 13 of the honeycomb formed bodies 10, their shapes are retained in the quadrangular segments 20, the triangular segments 30, a temporary assembly 41 and the honeycomb bonded body 40 which are subsequently formed. Therefore, to simplify illustration, constitutions of the cells 12 and the partition walls 13 in each of the quadrangular segment 20, the triangular segment 30, the temporary assembly 41 and the honeycomb bonded body 40 which will be described later are denoted with the same reference numerals, and detailed descriptions are omitted. Furthermore, FIGS. 1 to 4 show simplified constitutions of the cells 12 and the partition walls 13. Additionally, FIGS. 5 to 7 omit the illustrations of the cells 12 and the partition walls 13. In addition, FIG. 2 shows each of the extruded honeycomb formed body 10 and the after-mentioned fired quadrangular segment 20 (a honeycomb fired body).

In a firing step of firing the honeycomb formed bodies 10, the honeycomb formed bodies 10 obtained in the formed body firing step are subjected to a firing treatment at a high firing temperature in a furnace space of a firing furnace adjusted under the air atmosphere, an inert gas atmosphere or the like. Consequently, there are formed a plurality of quadrangular prismatic-columnar quadrangular segments 20 (see FIG. 2). It is to be noted that FIG. 2 shows a common constitution of the honeycomb formed body 10 and the quadrangular segment 20. However, water, a binder and others included in the honeycomb formed body 10 are removed in an actual firing step; and hence the quadrangular segment 20 slightly has a firing shrinkage as compared with the honeycomb formed body 10. Therefore, a size of the quadrangular segment 20 is slightly smaller than that of the unfired honeycomb formed body 10.

The triangular segment forming step is a step of extracting a segment from the quadrangular segments 20 formed in the firing step, and cutting the segment along a diagonal line DL (see a broken line in FIG. 2) in a quadrangular cross section 21 (corresponding to a fired body cross section) perpendicular to the central axis CA of the quadrangular segment 20 and in parallel with the central axis CA, to form the triangular prismatic-columnar triangular segment 30.

Here, the triangular prismatic-columnar triangular segment 30 has a first side surface F1, a second side surface F2 perpendicular to the first side surface F1, and an oblique side surface F3 to couple side ends of the first side surface F1 and the second side surface F2 with each other. Furthermore, a triangular cross section 31 (a triangular segment cross section) perpendicular to the central axis CA (see the quadrangular segment 20 of FIG. 2) is right-angled triangular. Here, the triangular cross section 31 is surrounded with a first side 32a corresponding to the first side surface F1, a second side 32b corresponding to the second side surface F2, and an oblique side 32c corresponding to the oblique side surface F3 (see FIG. 3).

Figure 2:
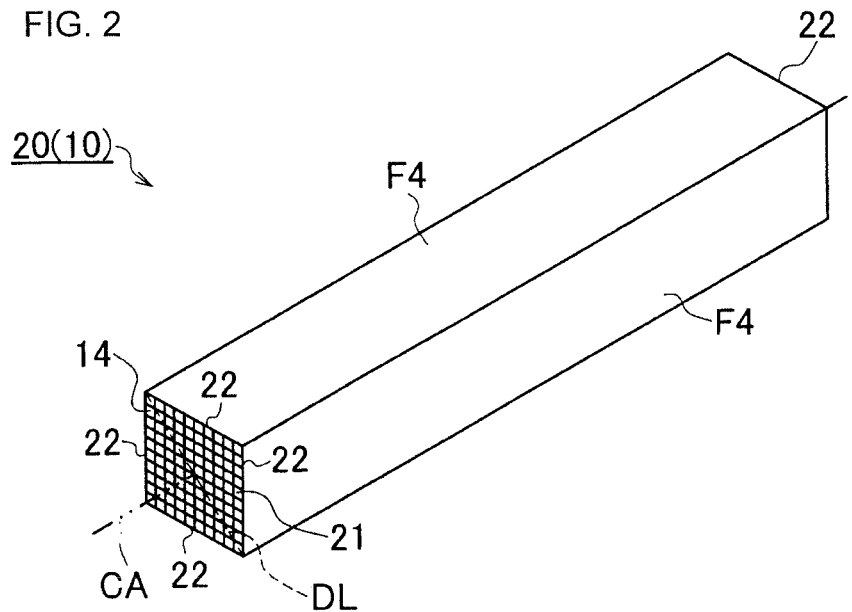
FIG. 2 is a perspective view schematically showing an example of an extruded quadrangular prismatic-columnar honeycomb formed body or a quadrangular prismatic-columnar quadrangular segment for use in formation of the honeycomb bonded body.
Figure 3:
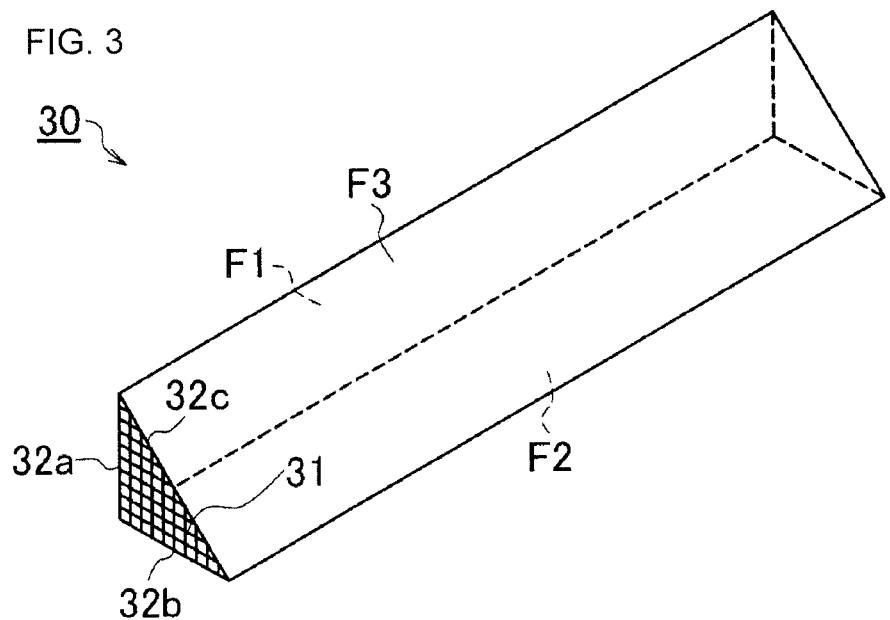
FIG. 3 is a perspective view schematically showing an example of a triangular prismatic-columnar triangular segment for use in the formation of the honeycomb bonded body.
Figure 4:
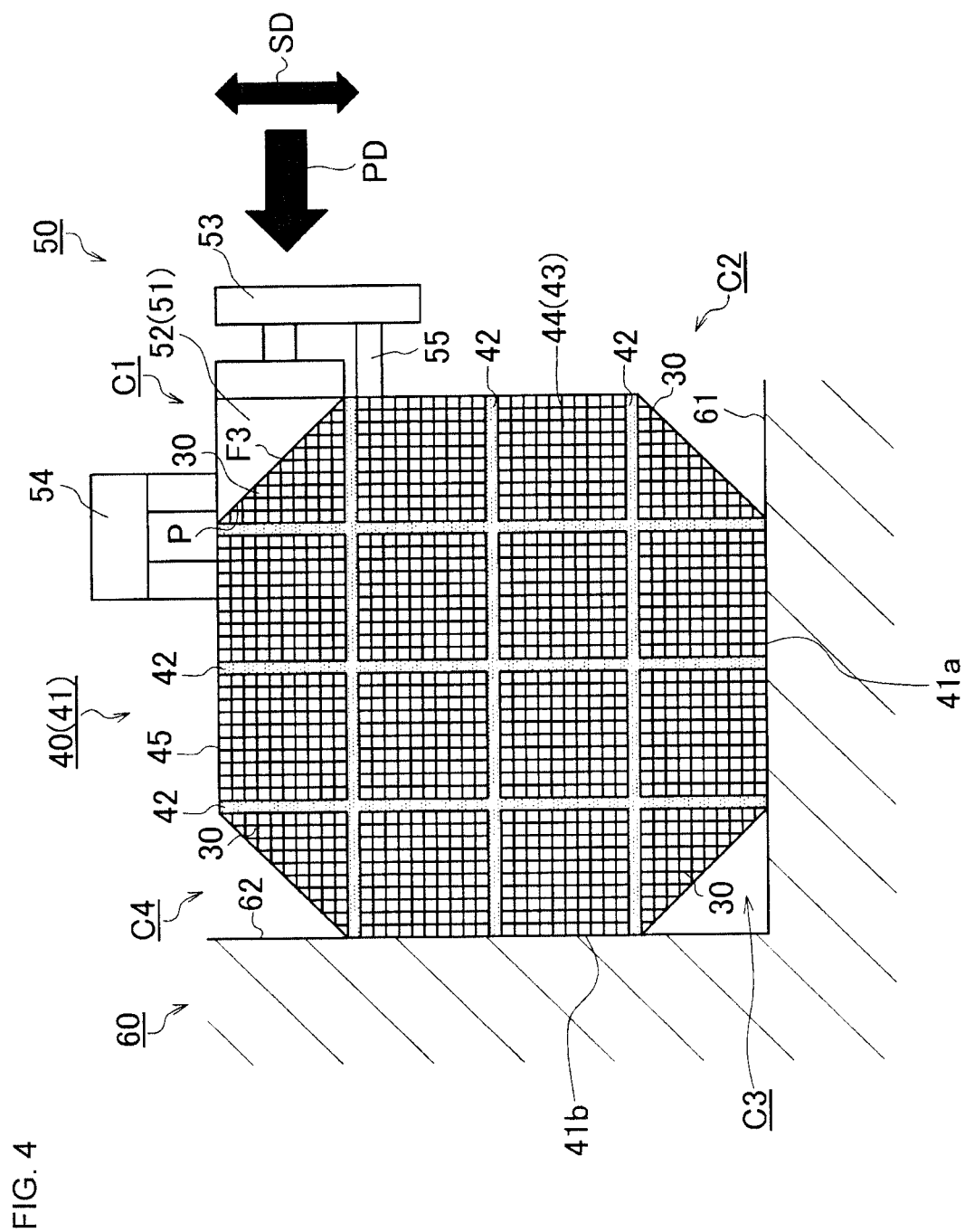
FIG. 4 is an explanatory view schematically showing a temporary assembly in which quadrangular segments and triangular segments are combined, and an example of pressurizing with a pressurizing jig.

The bonded body forming step is a step of combining the plurality of quadrangular segments 20 and the plurality of triangular segments 30 obtained in the above respective steps to form the honeycomb bonded body 40 (see FIG. 1 and FIG. 4). It is to be noted that in FIG. 4, the temporary assembly 41 is assembled by using twelve quadrangular segments 20 and four triangular segments 30, and a bonding material filled among the respective segments 20 and 30 is dried to form a bonding layer 42, thereby forming the honeycomb bonded body 40.

Further particularly, the triangular segments 30 are respectively arranged in corners C1, C2, C3 and C4 (see FIG. 4) (details will be described later) of the temporary assembly 41 (or the honeycomb bonded body 40) so that the oblique side surface F3 (the oblique side 32c) which intersects each of the first side surface F1 and the second side surface F2 of the triangular segment 30 at an acute angle becomes an outermost circumference.

Next, the triangular segments are arranged so that the residual first side surface F1 (the first side 32a) and the residual second side surface F2 (the second side 32b) in the triangular segment 30 face rectangular segment side surfaces F4 of the quadrangular segments 20, respectively. Consequently, there is constructed the temporary assembly 41 in which the plurality of triangular segments 30 and quadrangular segments 20 are combined. Here, in the temporary assembly 41, the bonding material is filled among the respective segments 20 and 30 and dried to form the bonding layer 42. In consequence, the honeycomb bonded body 40 is formed in the form of a block.

On the other hand, the circumference grinding step is a step of drying the honeycomb bonded body 40 obtained in the above bonded body forming step, and then grinding and processing a circumferential surface 45 of the honeycomb bonded body 40 along a prescribed grinding line GL (see a broken line in FIG. 1) to manufacture the honeycomb structure having a desirable shape such as a substantially round pillar shape. It is to be noted that in FIG. 1, the grinding line GL for a round cross section is set around the central axis CA, and the round pillar-shaped honeycomb structure can be manufactured.

In the above bonded body forming step, there is used a pressurizing jig 50 including a triangular prismatic columnar pressurizer 52 which includes a triangular pressurizing cross section 51 analogous to the triangular cross section 31 of the triangular segment 30 and a pressurizing oblique side surface P abuttable on the oblique side surface F3 of the triangular segment 30, and a pressurizer driving portion 53 which moves the pressurizer 52 toward a pressurizing direction PD perpendicular to the first side surface F1 or the second side surface F2 to press the triangular segment 30 along the pressurizing direction PD in a state where the pressurizing oblique side surface P of the pressurizer 52 abuts on the oblique side surface F3 (see FIG. 5) (details will be described later).

In the manufacturing method of the honeycomb structure of the present embodiment, the pressurizer 52 is used in which the pressurizing cross section 51 has the shape analogous to that of the triangular cross section 31 of the triangular segment 30. Here, the triangular cross section 31 of the triangular segment 30 and the pressurizing cross section 51 of the pressurizer 52 have the analogous shape as in the present embodiment or may have the same shape. However, when the triangular cross section 31 and the pressurizing cross section 51 have the same shape in exactly the same size, the cross sections might interfere with the quadrangular segments 20 during the pressurizing, thereby causing the possibility that the triangular segment cannot stably be pressurized toward the pressurizing direction PD. In consequence, it is particularly suitable to construct the pressurizer 52 including the pressurizing cross section 51 having the shape analogous to that of the triangular cross section 31 and having a size slightly smaller than that thereof.

That is, the bonded body forming step includes a pressurizing step of pressurizing the triangular segment 30 from a circumferential direction of the temporary assembly 41 toward a central direction thereof, by use of the pressurizing jig 50. It is to be noted that in the pressurizing step, the quadrangular segment 20 may be pressed together with the triangular segment 30 toward the pressurizing direction PD.

Hereinafter, description will further be made as to details of the manufacturing method of the honeycomb structure of the present embodiment.

(1) Preparation of Honeycomb Formed Body (Formed Body Forming Step):

Initially, a binder, a surfactant, a pore former, water and others are added to a ceramic raw material to prepare a forming raw material for extrusion. Here, as the ceramic raw material, there is suitably utilized at least one selected from the group consisting of, for example, silicon carbide (SiC), a silicon-silicon carbide based (Si—SiC based) composite material, a cordierite forming raw material, cordierite (Cd), mullite, alumina, titania, spinel, a silicon carbide (SiC)-cordierite (Cd) based composite material, lithium aluminum silicate, aluminum titanate, and an iron-chromium-aluminum based alloy. Among these examples, silicon carbide or the silicon-silicon carbide based composite material is particularly suitable.

Here, the cordierite forming raw material is the ceramic raw material blended in a chemical composition containing a silica component in a range of 42 to 56 mass %, an alumina component in a range of 30 to 45 mass % and a magnesia component in a range of 12 to 16 mass %, and the raw material is fired and then converted to cordierite. On the other hand, in the case of using the silicon-silicon carbide based composite material, silicon carbide powder and metal silicon powder are mixed and this mixture is considered as the ceramic raw material. Here, it is suitable that a content of the ceramic raw material is from 40 to 90 mass % of the whole forming raw material.

On the other hand, as the binder to be added to the forming raw material, methylcellulose, hydroxypropoxyl cellulose, hydroxyethyl cellulose, carboxymethyl cellulose, polyvinyl alcohol and others can be enumerated. Among these binders, it is suitable to use methylcellulose together with hydroxypropoxyl cellulose. Here, it is suitable that a content of the binder is from 3 to 15 mass % of the whole forming raw material.

Furthermore, it is suitable that a content of water is from 7 to 45 mass % of the whole forming raw material. On the other hand, as the surfactant, ethylene glycol, dextrin, fatty acid soap, polyalcohol or the like is usable. One of the surfactants may be used alone, or any combination of two or more surfactants may be used. Here, it is suitable that a content of the surfactant is 5 mass % or less of the whole forming raw material.

There are not any special restrictions on the pore former as long as the fired pore former forms pores, and examples of the pore former can include starch, a foamable resin, a water absorbable resin, silica gel, and carbon. It is suitable that a content of the pore former is 15 mass % or less of the whole forming raw material.

As described above, the prepared forming raw material (not shown) is extruded by using an extruder, to form a plurality of quadrangular prismatic columnar honeycomb formed bodies 10 so that a shape of each formed body cross section 14 perpendicular to the central axis CA is rectangular (more accurately a square) (see FIG. 2). Here, there are not any special restrictions on the number of the honeycomb formed bodies 10 to be formed, but the number of the honeycomb formed bodies can arbitrarily be determined in accordance with a shape, a size or the like of the honeycomb structure to be prepared.

In the manufacturing method of the honeycomb structure of the present embodiment, 14 quadrangular prismatic columnar honeycomb formed bodies 10 are prepared. It is to be noted that the formed body forming step of extruding the forming raw material to form the honeycomb formed bodies 10 is well known, and hence detailed description is omitted here. Furthermore, for example, a step of cutting each extruded honeycomb formed body 10 in a desirable honeycomb length is also well known, and hence detailed description is omitted.

The honeycomb formed body 10 just cut after the body is extruded contains a lot of water in the forming raw material, and is easily deformable by an external force. To eliminate the problem, the honeycomb formed body 10 is dried by a well-known heating drying method such as microwave heating drying, electromagnetic heating drying or hot air drying. Consequently, the water contained in the forming raw material transpires to the outside, and a predetermined amount of water contained in the honeycomb formed body 10 is removed. This is a measure to prevent generation of cracks such as firing cracks during the firing.

To the obtained honeycomb formed body 10, plugging portions (not shown) may be formed at cell open ends of the predetermined cells 12 in the one end face 11*a* and open ends of the residual cells 12 in the other end face 11*b*, respectively. The honeycomb formed body (not shown) in which the plugging portions are formed becomes a plugged honeycomb formed body in which the predetermined cells 12 including the plugging portions formed on the side of the one end face 11*a* and the residual cells 12 including the plugging portions formed on the side of the other end face 11*b* are alternately arranged and in which, for example, checkerboard patterns are formed in both the end faces 11*a* and 11*b*, respectively. When such a plugged honeycomb formed body is formed, the honeycomb structure obtained by the manufacturing method of the honeycomb structure of the present embodiment becomes a plugged honeycomb structure. It is to be noted that a forming method of the plugging portions in the honeycomb formed body 10, a plugging material for use and others are already well known, and hence description is omitted here.

(2) Preparation (Firing Step) of Quadrangular Segment (Honeycomb Fired Body):

A firing treatment of the honeycomb formed body 10 obtained in the formed body forming step is performed at a prescribed firing temperature, thereby obtaining the quadrangular prismatic-columnar quadrangular segment 20. It is to be noted that in the firing step, a degreasing step (a calcinating step) to remove an organic material such as the binder contained in the forming raw material may be performed as a previous stage prior to a main firing step of performing the firing at a high firing temperature.

A degreasing treatment (a calcinating treatment) can be performed, for example, under the air atmosphere including oxygen, and a calcinating temperature, a calcinating time or the like can arbitrarily be set. The honeycomb formed body 10, from which the binder of the organic material or the like is removed by performing this calcinating treatment, is subjected to the main firing step at the higher firing temperature. It is to be noted that firing conditions can arbitrarily be changed in accordance with a type of the forming raw material, or the like. For example, when silicon carbide or the silicon-silicon carbide based composite material is used as a main component of the forming raw material, a firing atmosphere can be set to an inert gas atmosphere of a nitrogen gas, an argon gas or the like, and the firing can be performed while holding the honeycomb formed body at a firing temperature of 1300° C. to 1500° C. for about 1 hour to 10 hours.

The quadrangular segment 20 formed in the firing step usually has the porous partition walls 13. Here, it is desirable that a porosity of the partition walls is from about 30% to 80% and more suitably from 35% to 65%. When the porosity of the partition walls is adjusted in the above range, the honeycomb structure to be manufactured has the advantage that it is possible to suppress pressure loss while maintaining its strength. On the other hand, when the porosity is lower than 30%, there occurs the problem that the pressure loss rises, and when the porosity is in excess of 80%, there is, for example, the influence that the strength deteriorates and a thermal conductivity decreases. Here, the porosity can be measured by a well-known method such as Archimedes' method.

Furthermore, it is desirable that an average pore diameter of the partition walls 13 of the quadrangular segment 20 is from 5 μm to 50 μm and more suitably from 7 μm to 35 μm. When the average pore diameter is adjusted in the above range, the honeycomb structure has the advantage that it is possible to increase a trapping efficiency of particulate matter (PM). On the other hand, when the average pore diameter is smaller than 5 μm, clogging with the particulate matter easily occurs, and when the average pore diameter is in excess of 50 μm, the particulate matter is not trapped but easily passes through the honeycomb structure. Here, the average pore diameter can be measured with a well-known mercury porosimeter or the like.

In particular, when a main component of the partition walls 13 constituting the quadrangular segment 20 is silicon carbide, it is preferable that an average particle diameter of silicon carbide particles is from 5 to 100 μm. When the average particle diameter is adjusted in such a range, there is the advantage that the above-mentioned porosity and average pore diameter of the partition walls for use as a filter can easily be controlled. On the other hand, when the average particle diameter is smaller than 5 μm, pore diameters excessively decrease, and when the average particle diameter is larger than 100 μm, the porosity might decrease. When the pore diameters are excessively small, the clogging with the particulate matter (PM) easily occurs, and when the porosity is excessively small, the pressure loss might rise. Here, the average particle diameter can be measured in conformity with JIS R 1629.

Furthermore, there are not any special restrictions on a shape (a cell shape) of the cells 12 of the quadrangular segment 20, i.e., the shape of the cells 12 in the cross section (the quadrangular cross section 21) perpendicular to the central axis CA (corresponding to an extending direction of the cells 12) (see FIG. 2). For example, the shape may be a polygonal shape such as a triangular shape, a quadrangular shape (particularly a square), a hexagonal shape or an octagonal shape, a curved shape such as a round shape or an elliptic shape, or furthermore any combination of these shapes.

It is to be noted that a thickness of each of the partition walls 13 defining the above cell shape can be adjusted in a range of 50 μm to 2000 μm. When the thickness of the partition walls 13 is smaller than 50 μm, there is a risk that the strength of the honeycomb structure itself might decrease, and when the thickness of the partition walls 13 is larger than 2000 μm, there is the problem that the pressure loss increases. Furthermore, there are not any special restrictions on a cell density of the quadrangular segment 20, but the cell density is, for example, suitably from 0.9 to 311 cells/cm$^2$ and further suitably from 7.8 to 62 cells/cm$^2$.

Here, in the quadrangular prismatic-columnar quadrangular segment 20 formed in the manufactured method of the honeycomb structure of the present embodiment, for example, a vertical size×a transverse size×a length (the length in a central axis direction) can be set to, for example a range of 30 mm×30 mm×80 mm to 50 mm×50 mm×400 mm.

Furthermore, a thermal expansion coefficient of the quadrangular segment 20 is, for example, suitably 1×10$^{-6}$/° C. or more and further suitably in a range of 2×10$^{-6}$/° C. to 7×10$^{-6}$/° C. In consequence, the honeycomb structure having an excellent thermal shock resistance can be obtained.

(3) Preparation of Triangular Segment (Triangular Segment Forming Step):

The triangular segment forming step is a step of extracting a segment from the plurality of formed quadrangular segments 20, and cutting the segment along one diagonal line DL in the quadrangular cross section 21 perpendicular to the central axis CA and in parallel with the central axis CA, to form the triangular prismatic-columnar triangular segment 30. Consequently, the triangular segment 30 can be formed which includes three side surfaces F1, F2 and F3 and in which the triangular cross section 31 is right-angled triangular. It is to be noted that when the segment is cut along the diagonal line DL and in parallel with the central axis CA, two triangular segments 30 having the same solid shape can be obtained from one quadrangular segment 20. Here, a cut surface of the quadrangular segment 20 which is parallel to the central axis CA becomes the oblique side surface F3 in the triangular segment 30.

Additionally, in the manufacturing method of the honeycomb structure of the present embodiment, two quadrangular segments 20 are selected from the 14 formed quadrangular segments 20, and the quadrangular segments 20 are cut to obtain four triangular prismatic-columnar triangular segments 30 in total. "The quadrangular prismatic-columnar quadrangular segment 20 is cut along the diagonal line DL in the quadrangular cross section 21 perpendicular to the central axis CA and in parallel with the central axis CA", and hence the two triangular segments 30 formed from the one quadrangular segment 20 have the same solid shape. Furthermore, the triangular cross sections 31 each having a right-angled triangular shape perpendicular to the central axis CA have, for example, the same area, shape and size.

Here, when the quadrangular segment 20 is cut along the central axis CA to form the triangular segments 30, a cutting device such as a well-known diamond cutter is usable. Such a diamond cutter device includes a round or linear cutter blade to which fine diamond abrasive grains are adhered, and is suitably used to cut a hard material such as ceramics in an arbitrary shape.

(4) Formation of Honeycomb Bonded Body (Bonded Body Forming Step):

(4-1) Construction of Temporary Assembly:

Next, twelve quadrangular segments 20 and four triangular segments 30 obtained in the above steps are combined to construct the temporary assembly 41. It is to be noted that there are not any special restrictions on the number of the quadrangular segments 20 and the number of the triangular segments 30, respectively, and the numbers can arbitrarily be set (e.g., see FIG. 8). Furthermore, in the manufacturing method of the honeycomb structure of the present embodiment, as schematically shown in FIG. 4, there may be used a device such as a guide portion 60 having a bottom surface portion 61 which abuts on an assembly bottom surface 41a of the temporary assembly 41, and a side surface portion 62 which abuts on one assembly side surface 41b of the temporary assembly 41 and is disposed vertically to the bottom surface portion 61, to support formation of the honeycomb bonded body 40 from two directions of its bottom surface and its one side surface. Here, FIG. 4 shows a front view of the constructed temporary assembly 41 viewed from a direction of an assembly cross section 43.

Here, in the assembly cross section 43 of the temporary assembly 41, the triangular segments 30 are arranged so that the first side 32a including the first side surface F1 and the second side 32b including the second side surface F2 which are perpendicular to each other respectively face segment sides 22 including the segment side surfaces F4 in the quadrangular segments 20 and so that the oblique sides 32c including the oblique side surfaces F3 in the triangular segments 30 become the outermost circumference. Furthermore, the four triangular segments 30 are positioned in the four corners C1, C2, C3 and C4 in the assembly cross section 43 of the temporary assembly 41 (a bonded body cross section 44 of the honeycomb bonded body 40), respectively.

Additionally, two quadrangular segments 20 are arranged horizontally (or arranged vertically) between a pair of triangular segments 30 in the respective triangular segments arranged in the corners C1, C2, C3 and C4. Consequently, a circumferential portion of the temporary assembly 41 is constituted of four triangular segments 30 and eight quadrangular segments 20. Furthermore, a central portion in the assembly cross section 43 is constituted of four quadrangular segments 20 including two vertically arranged quadrangular segments and two horizontally arranged quadrangular segments.

Here, actual construction of the temporary assembly 41 is formed by gradually laminating layers, for example, by forming the lowermost layer constituted of two triangular segments 30 and two quadrangular segments 20 and further constructing an upper layer constituted of four quadrangular segments 20 as shown in FIG. 4. Furthermore, the bonding material is filled in a prescribed width (thickness) among the respective segments 20 and 30 when another segment is laminated on an upper side of the segment or the segments are arranged in parallel with each other. Consequently, the triangular segment 30 and the quadrangular segment 20 are bonded to each other, or the quadrangular segments 20 are bonded to each other. However, the bonding material immediately after the material is filled does not completely dry yet, but is easily deformable by external stress. Additionally, there is the possibility that the width (thickness) of the bonding material is easily changed by the external stress, and varies among the respective segments.

(4-2) Formation of Honeycomb Bonded Body (Pressurizing Step):

Next, the temporary assembly 41 constructed in a state where two surfaces of the assembly bottom surface 41a and the one assembly side surface 41b are supported from the bottom surface direction and the one side surface direction (a left direction of a paper surface in FIG. 4) by the guide portion 60 is pressurized with a uniform force from the residual two directions (an upward direction and the other side surface direction (a direction which is opposite to the one side surface direction)) to tighten the temporary assembly 41 from the outermost circumference toward its inner side. Consequently, the triangular segments 30 and the quadrangular segments 20 are pressed toward the bottom surface portion 61 and the side surface portion 62 of the guide portion 60, respectively. At this time, when the triangular segments 30 and the quadrangular segments 20 are pressed with the uniform force, a width of the bonding layer 42 between the segments 20 and 30 can be adjusted to be constant. As a result, the honeycomb bonded body 40 having an excellent shape stability is obtainable. Furthermore, unlike conventional technologies, for example, an auxiliary material made of aluminum or the like and having the same sectional shape as in the triangular segment is not required, and it is not necessary to form a pseudo honeycomb segment by use of such auxiliary materials.

In other words, it is possible to form the honeycomb bonded body 40 "in which the triangular segments 30 and the quadrangular segments 20 are combined and bonded, in the state where the oblique side surfaces F3 of the four triangular segments 30 respectively arranged in the corners C1, C2, C3 and C4 constitute the outermost circumference and the first side surface F1 and the second side surface F2 of the triangular segment 30 face the segment side surfaces F4 of the quadrangular prismatic-columnar quadrangular segments 20, in the bonded body cross section 44 perpendicular to the central axis CA" (see FIG. 1 and FIG. 4).

When the segments are combined while bonding the segment side surfaces F4 of the quadrangular segments 20 and the side surfaces F1 and F2 of the triangular segments 30 with the bonding material, for example, a masking tape or the like can be attached to regions to which it is not preferable to adhere the bonding material, for example, end faces of the quadrangular segments 20 and the triangular segments 30, to protect the end faces and the like from the bonding material.

Here, an example of the bonding material for use in the bonded body forming step can be a slurry obtained by adding an organic binder, a foamable resin, a dispersing agent, water and others to a filler such as inorganic fibers, colloidal silica, clay or SiC particles, followed by kneading. This bonding material is filled among the side surfaces F1, F2 and F4 of the respective segments 20 and 30, and dried, so that the bonding layer 42 can be formed in which the bonding material hardens.

(4-3) Pressurizing Jig:

Thus, the quadrangular prismatic-columnar quadrangular segments 20 and the triangular segments 30 are combined while bonding the segments, and the segments are pressurized to tighten the segments from the outermost circumference toward the inner side, thereby forming the honeycomb bonded body 40. In this case, the pressurizing jig 50 shown in FIG. 4 to FIG. 7 is used in the manufacturing method of the honeycomb structure of the present embodiment.

The pressurizing jig 50 includes the triangular prismatic columnar pressurizer 52 having the triangular pressurizing cross section 51 analogous to the triangular cross section 31 of the triangular segment 30 and having the pressurizing oblique side surface P abuttable on the oblique side surface F3 of the triangular segment 30, and the pressurizer driving portion 53 which moves the pressurizer 52 along the pressurizing direction PD perpendicular to the first side surface F1 or the second side surface F2 in the state where the pressurizing oblique side surface P abuts on the oblique side surface F3 (from a right direction of the paper surface to the left direction thereof in FIG. 4) to pressurize the segments.

Here, there are not any special restrictions on the pressurizer driving portion 53 as long as it is possible to transmit a predetermined pressure (e.g., from 10 kPa to 200 kPa) to the respective segments 20 and 30 by, for example, a hydraulic, pneumatic or electric cylinder. Furthermore, an elastic material such as rubber may be used in the pressurizer 52 and a quadrangular segment pressurizer 55 (described later) which abut on the triangular segment 30 and the quadrangular segment 20, respectively. Here, for simplification, FIG. 5 and FIG. 6 omit illustration of the cells and partition walls which appear in the respective segments 20 and 30.

Figure 5:
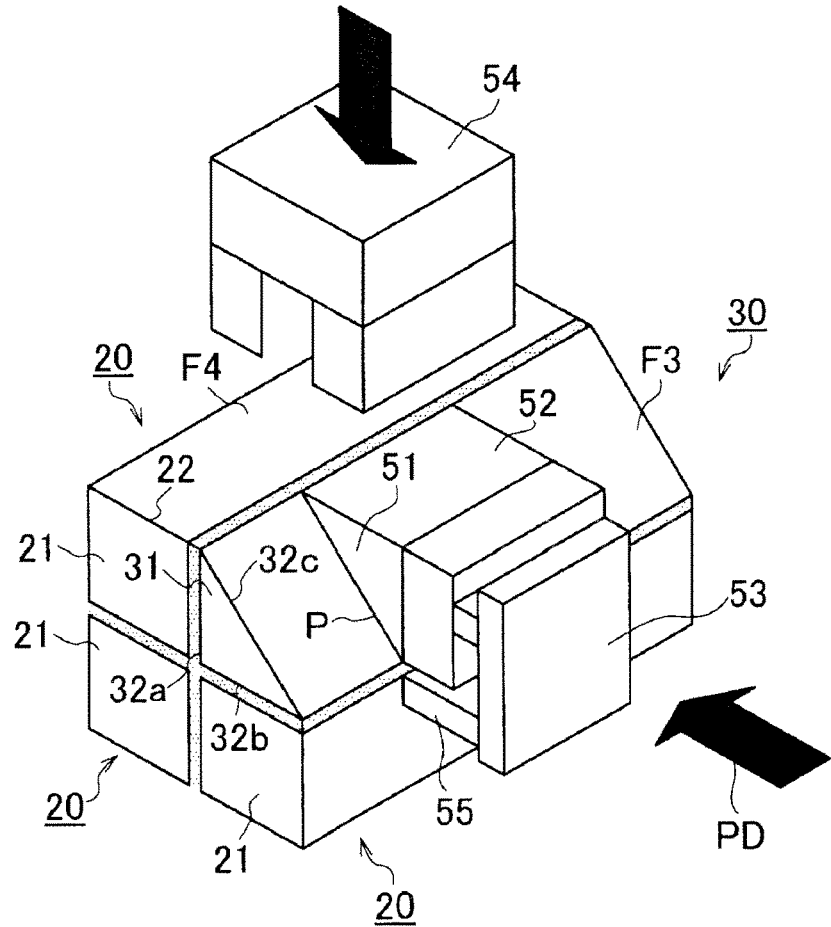
FIG. 5 is a perspective view schematically showing an example of pressurizing of the triangular segment by use of the pressurizing jig.

In the pressurizing step, initially, the pressurizing oblique side surface P of the pressurizer 52 is disposed to abut on the oblique side surface F3 of the triangular segment 30 disposed in the corner portion C1 or the like (see FIG. 5). The pressurizing jig 50 further includes a movement regulating portion 54 which prohibits the triangular segment 30 and the quadrangular segment 20 from being transferred and raised (from the downside toward the upside in FIG. 5) from a central direction toward a circumferential direction by pressurizing. Consequently, even when the triangular segment 30 is pressurized from the pressurizing direction PD by the pressurizer 52, upward movement of the triangular segment 30 and the quadrangular segment 20 adjacent to this triangular segment 30 is regulated. Therefore, it is possible to align a position of an intersection point of the segment side surface F4 of the quadrangular segment 20 and the first side surface F1 and the oblique side surface F3 of the triangular segment 30.

Furthermore, the pressurizing jig 50 presses the triangular segment 30 in the pressurizing direction PD by the pressurizer 52, and includes the quadrangular segment pressurizer 55 to pressurize the quadrangular segment 20 positioned under the triangular segment 30 along the pressurizing direction PD. Consequently, it is possible to pressurize the quadrangular segment 20 simultaneously with the pressurizing of the triangular segment 30. Additionally, a relative positional relation between the pressurizer 52 and the quadrangular segment pressurizer 55 does not change, and hence an amount of the triangular segment 30 and the quadrangular segment 20 to be pressurized (an amount thereof to be pressed) can be quantified.

Figure 6:
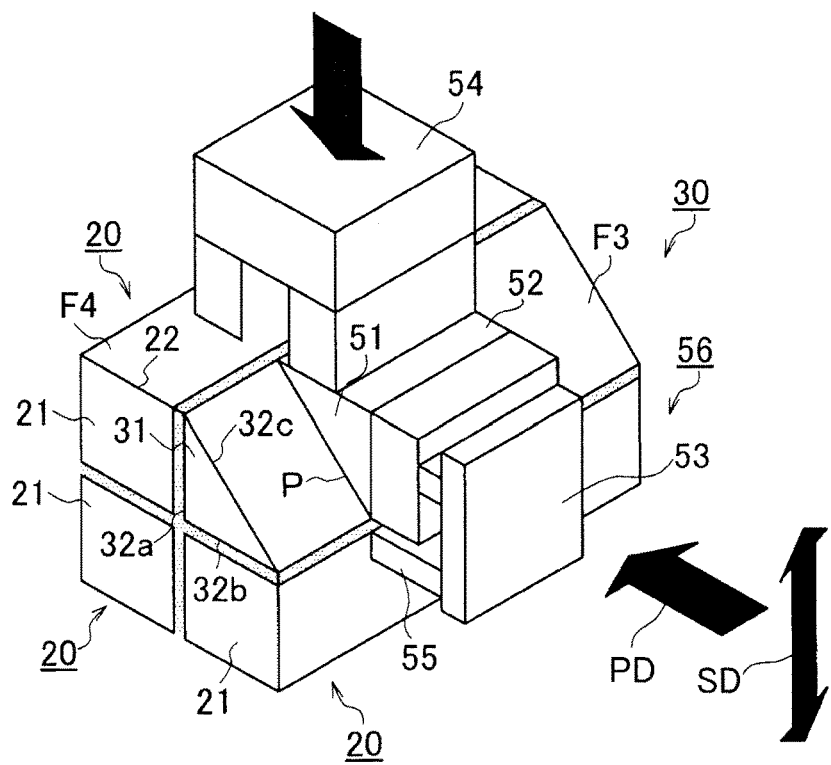
FIG. 6 is a perspective view schematically showing an example of a movable direction perpendicular to a pressurizing direction of a pressurizer of the pressurizing jig.

In addition, the pressurizing jig 50 for use in the manufacturing method of the honeycomb structure of the present embodiment may include a swinging mechanism portion 56 which can swing the pressurizer 52 along a swinging direction SD (see FIG. 6) perpendicular to the pressurizing direction PD, when pressurizing the triangular segment 30 along the pressurizing direction PD by the pressurizer 52 as shown in FIG. 6. That is, in the case of FIG. 6, the pressurizer 52 is slightly movable along an upward-downward direction. In other words, the pressurizer can slide along the swinging direction SD perpendicular to the pressurizing direction PD. Here, the swinging mechanism portion 56 can employ a constitution to slide to the pressurizer driving portion 53 by a well-known slide mechanism or the like. It is to be noted that the swinging direction SD of the pressurizer 52 is not limited to the upward-downward direction, but the swinging direction SD can be, for example, a right-left direction, when the pressurizing direction PD is directed from the upside toward the downside.

When the bonding material is filled between the segment 20 and the segment 30 and the segments are pressurized to tighten the segments from the circumferential direction toward the central direction, the width of the bonding layer 42 decreases. As a result, a size of the honeycomb bonded body 40 becomes smaller than that of the temporary assembly 41 at the start of the pressurizing. At this time, the pressurizer 52 of the pressurizing jig 50 in the manufacturing method of the honeycomb structure of the present embodiment is formed to be swingable in the upward-downward direction (or the right-left direction), and hence it is possible to stably pressurize the triangular segment 30 in the pressurizing direction PD in accordance with the above change of the size. As a result, it is possible to avoid, for example, the disadvantage that the width of the bonding layer 42 between the respective segments 20 and 30 becomes non-uniform. This enables the pressurizing on pressurizing conditions that the width of each bonding layer 42 is quantified by the pressurizing, and it is possible to form the honeycomb bonded body 40 having the excellent shape stability. Particularly in the manufacturing method of the honeycomb structure of the present embodiment, it is not necessary to prepare a tubular auxiliary member having the same shape as in the cross section of the triangular segment as in Patent Document 4 described above, and furthermore, an operation of forming the pseudo segment in which the triangular segment and the auxiliary member are combined is not required. In consequence, it is possible to decrease cost required for the auxiliary member and the like, and it is also possible to simplify a manufacturing process.

The manufacturing method of the honeycomb structure of the present embodiment is not limited to such an example as described above where one pressurizing jig 50 is used for one triangular segment 30. That is, the one triangular segment 30 may be pressurized simultaneously from multiple directions by use of a pair of pressurizing jigs 50 or three pressurizing jigs 50 (e.g., see FIG. 7). It is to be noted that for the simplification, FIG. 7 omits illustrations of cells, partition walls and furthermore a partial constitution of a pressurizer driving portion.

Hereinafter, description will be made as to an example of the pressurizing of the triangular segment 30 by use of three pressurizing jigs 50a, 50b and 50c shown in FIG. 7. Initially, a first pressurizer 52a of a first pressurizing jig 50a and a third pressurizer 52c of a third pressurizing jig 50c are disposed apart from each other along a segment length direction of a triangular segment 30, and respective pressurizing oblique side surfaces P1 and P3 are disposed to abut on an oblique side surface F3 of the triangular segment 30. Consequently, the triangular segment 30 can be pressurized along a first pressurizing direction PD1 (from a right oblique downward direction to a left oblique upward direction in a paper surface of FIG. 7) by the first pressurizing jig 50a and the third pressurizing jig 50c.

Figure 7:
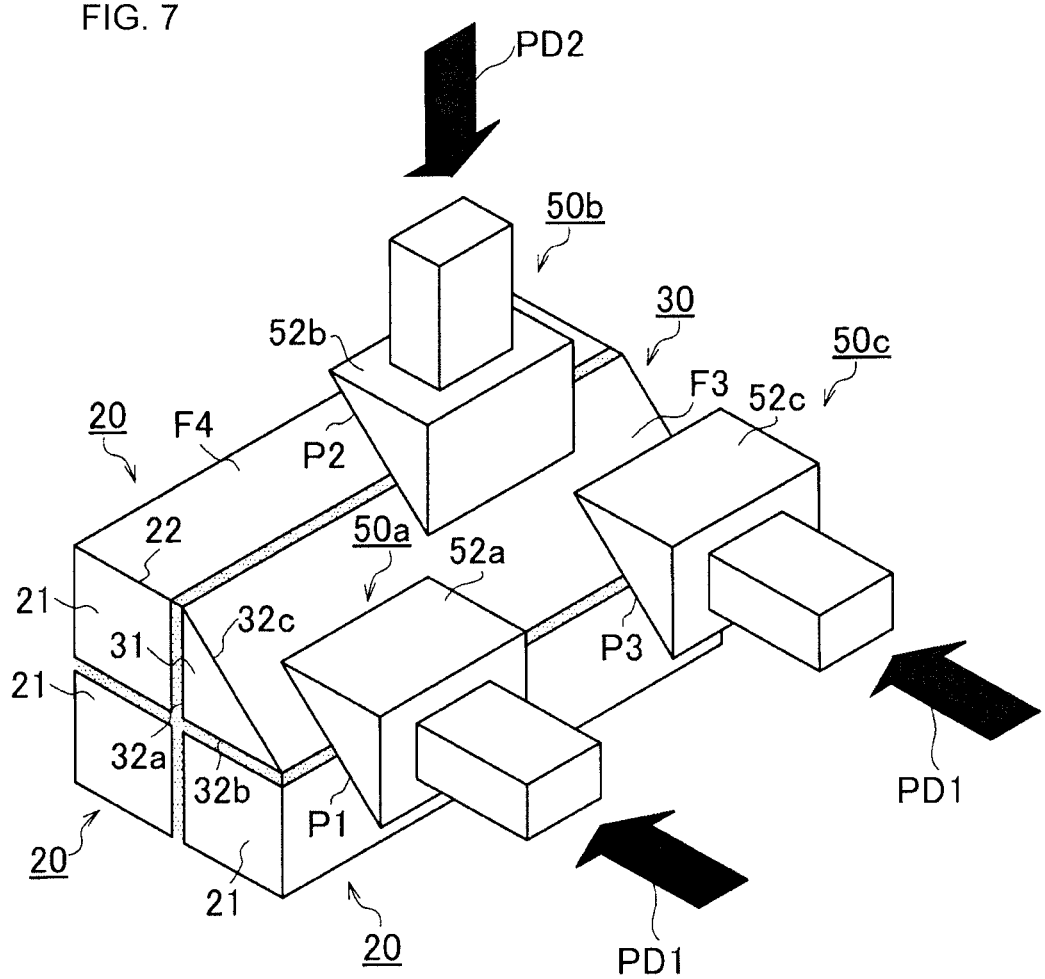
FIG. 7 is a perspective view schematically showing an example of pressurizing of a triangular segment by use of three pressurizing jigs.

On the other hand, a second pressurizer 52b of a second pressurizing jig 50b is configured to pressurize the triangular segment 30 along a direction (a second pressurizing direction PD2: from an upward direction to a downward direction in the paper surface of FIG. 7) perpendicular to the first pressurizing direction PD1 by the first and third pressurizing jigs 50a and 50c, and the second pressurizer 52b is inserted between the first pressurizer 52a and the third pressurizer 52c, so that the pressurizing oblique side surface P2 abuts on an oblique side surface P.

Then, simultaneously with the start of the pressurizing of the triangular segment 30 from the first pressurizing direction PD1 by the first pressurizing jig 50a and the third pressurizing jig 50c, the pressurizing of the triangular segment 30 is started from the second pressurizing direction PD2 perpendicular to the first pressurizing direction PD1 by the second pressurizing jig 50b. Consequently, the triangular segment 30 is pressurized simultaneously from two directions (the first pressurizing direction PD1 and the second pressurizing direction PD2). It is to be noted that although not shown in FIG. 7, quadrangular segments 20 positioned adjacent to and under the triangular segment 30 are pressurized, respectively, simultaneously with the pressurizing of the triangular segment 30, so that a honeycomb bonded body 40 having a more stable shape can be formed. In FIG. 7, the above-mentioned constitution of the movement regulating portion 54 may be provided.

The honeycomb bonded body 40 formed through the above-mentioned steps is dried at a predetermined drying temperature. Consequently, the bonding layer 42 dries to strengthen the bonding of the respective segments 20 and 30. Afterward, the circumferential surface 45 of the honeycomb bonded body 40 is ground and processed along the prescribed grinding line GL (see FIG. 1), thereby completing the manufacturing of the honeycomb structure having a desirable shape (e.g., the round pillar shape). It is to be noted that the circumference grinding step of grinding the circumferential surface 45 by use of a grinding wheel or the like is well known, and hence detailed description is omitted here.

For example, it has been described that in the manufacturing method of the honeycomb structure of the present embodiment, as shown in FIG. 1 and FIG. 4, the honeycomb bonded body 40 (the honeycomb structure) of the structure in which four triangular segments 30 are respectively arranged in the four corners C1, C2, C3 and C4 is formed (or manufactured) by using twelve quadrangular segments 20 and the four triangular segments 30, but the present invention is not limited to this example.

Figure 8:
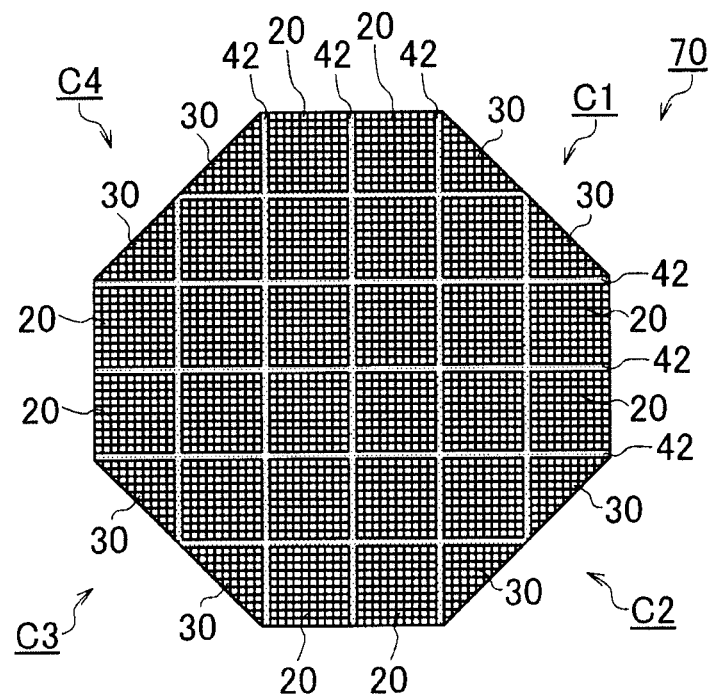
FIG. 8 is a front view schematically showing an example of a honeycomb bonded body including a constitution of another example and formed in the bonded body forming step of the manufacturing method of the honeycomb structure of the present invention.

For example, as shown in FIG. 8, by use of 24 quadrangular segments 20 and eight triangular segments 30, a honeycomb bonded body 70 may be formed in which two triangular segments 30 are obliquely arranged in each of corners C1, C2, C3 and C4 so that oblique side surfaces F3 of all the triangular segments 30 constitute the outermost circumference. Furthermore, it has been described that the vertical and horizontal lengths of the bonded body cross section 44 perpendicular to the central axis CA have the same size, but the present invention is not limited to this example, and the honeycomb structure may possess a shape of a bonded body cross section having different ratios between the vertical size and the horizontal size (the length). Here, in FIG. 8, the same constitutions as in FIG. 1, FIG. 4 and others are denoted with the same reference numerals.

Additionally, it has been described that in the manufacturing method of the honeycomb structure of the present embodiment, by use of the guide portion 60, the temporary assembly 41 is pressurized in the state where the temporary assembly is supported from two directions as shown in FIG. 4, but the present invention is not limited to this example. For example, in the case of forming the honeycomb bonded body 70 of FIG. 8 as described above, there may be used a pressurizing device 80 (see FIG. 9) to pressurize, from all directions, all quadrangular segments 20 and triangular segments 30 that appear in a circumferential surface 72 of a temporary assembly 71 from a circumferential direction of the temporary assembly 71 toward a center thereof. In this case, a pressurizer driving portion 84 executes control so that at least a pair of pressurizers 82 abut on all eight triangular segments 30 arranged at the outermost circumference, to pressurize the triangular segments simultaneously from two pressurizing directions perpendicular to each other (e.g., a first pressurizing direction PD1 and a second pressurizing direction PD2). Furthermore, a pressurizing jig 81 includes quadrangular segment pressurizers 83 to pressurize the quadrangular segments 20 arranged at the outermost circumference. Consequently, the quadrangular segments 20 are also simultaneously pressurized.

Figure 9:
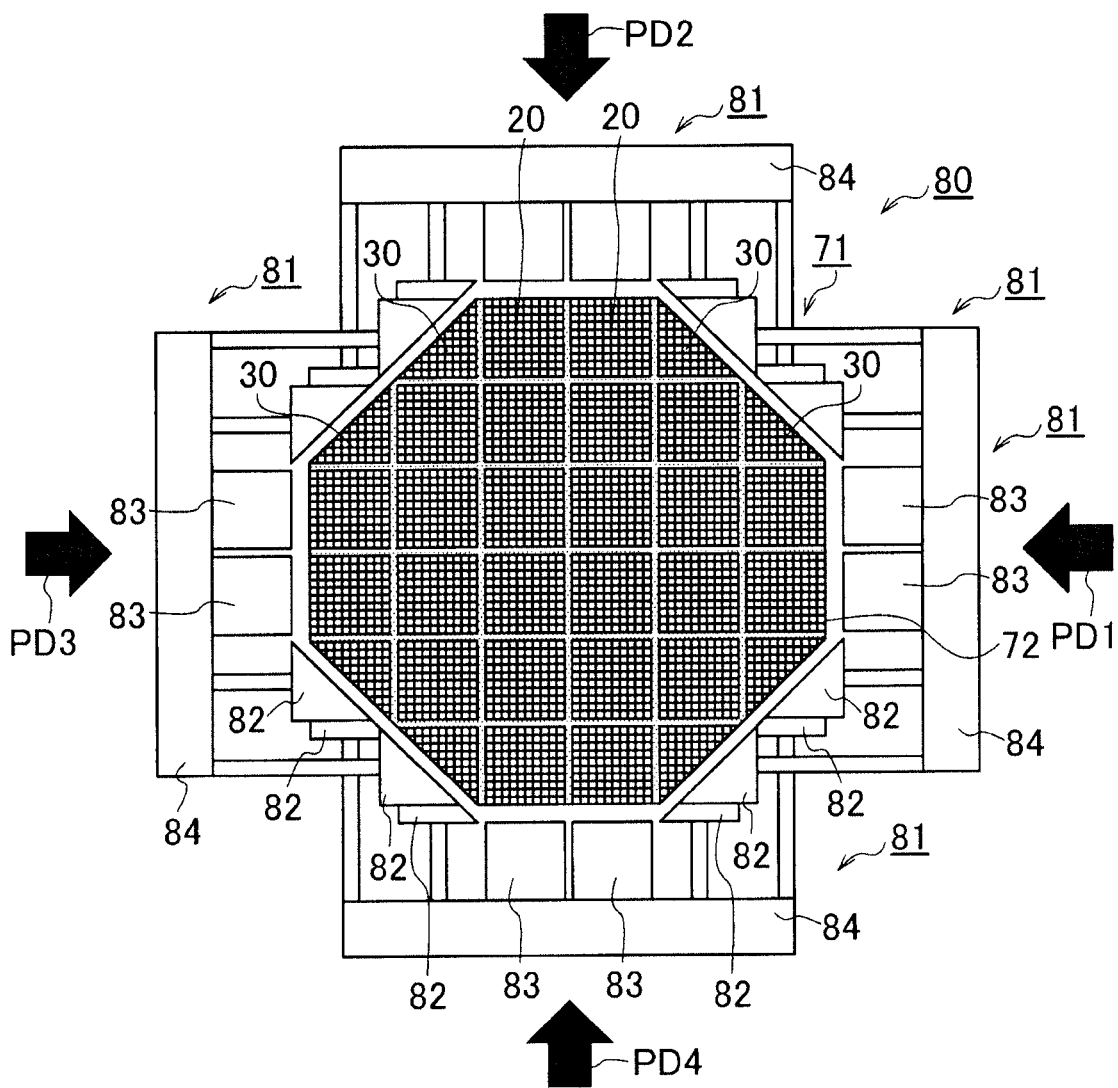
FIG. 9 is an explanatory view schematically showing an example of a pressurizing device in which a plurality of pressurizing jigs are used to form the honeycomb bonded body of FIG. 8.

In the case of the pressurizing device 80 shown in FIG. 9, the triangular segments 30 and the quadrangular segments 20 on the side of a left side surface of the temporary assembly 71 are pressurized from a third pressurizing direction PD3 (corresponding to a direction from the left of a paper surface to the right thereof in FIG. 9) which is opposite to the first pressurizing direction PD1 (corresponding to a direction from the right of the paper surface to the left thereof in FIG. 9). Similarly, the triangular segments 30 and the quadrangular segments 20 on the side of a bottom surface of the temporary assembly 71 are pressurized from a fourth pressurizing direction PD4 (corresponding to a direction from the downside of the paper surface to the upside thereof in FIG. 9) which is opposite to the second pressurizing direction PD2 (corresponding to a direction from the upside of the paper surface to the downside thereof in FIG. 9). In this way, the temporary assembly 71 is simultaneously pressurized with a constant force from four directions (the first pressurizing direction PD1, the second pressurizing direction PD2, the third pressurizing direction PD3 and the fourth pressurizing direction PD4) toward the center of the temporary assembly 71, and hence the force is more uniformly applied to the triangular segments 30 and the quadrangular segments 20, thereby adjusting the width of the bonding layer 42 among the respective segments 20 and 30 to be more uniform. In consequence, it is possible to form the honeycomb bonded body 70 having a further excellent shape stability as shown in FIG. 8.

Figure 10:
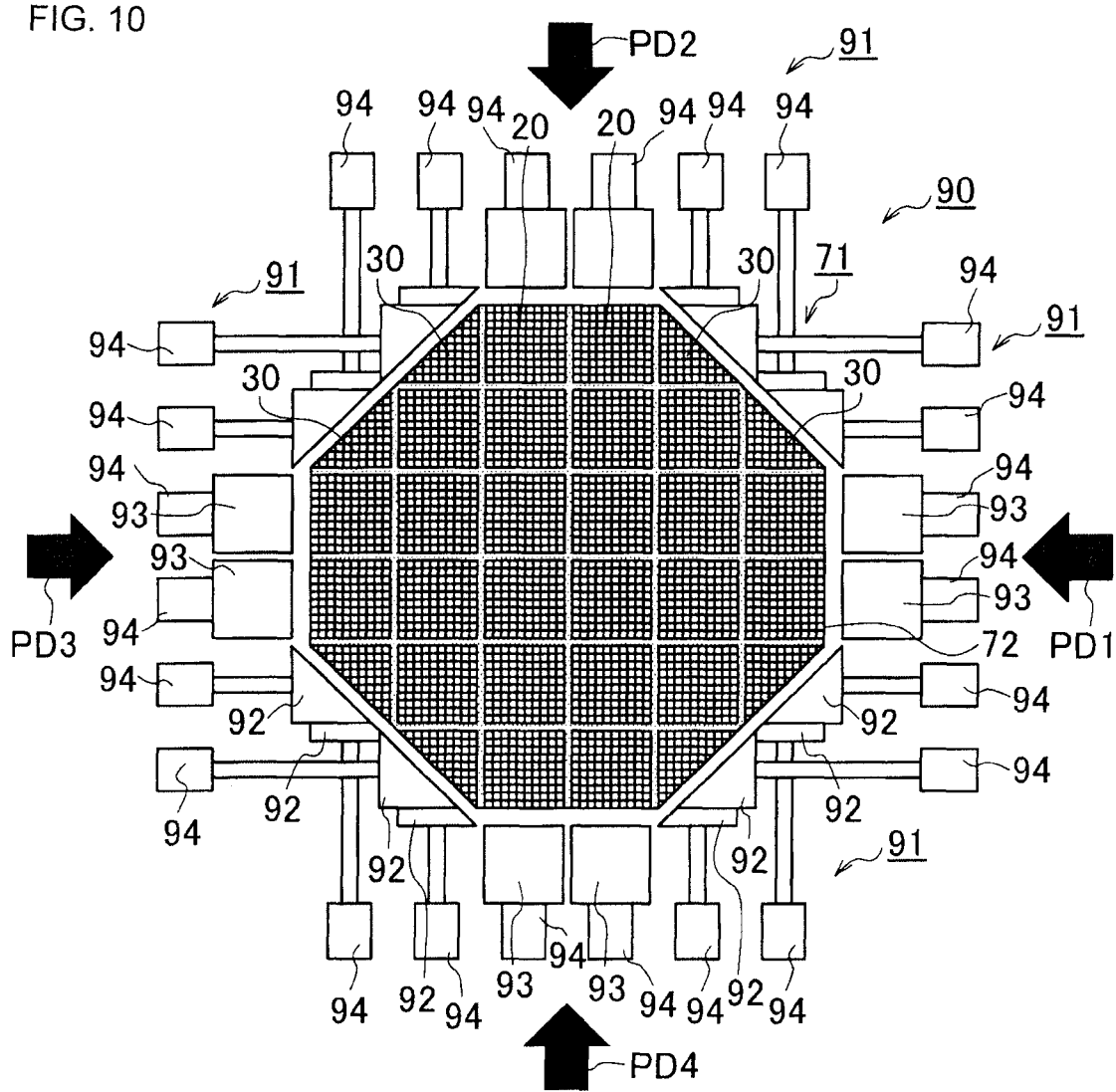
FIG. 10 is an explanatory view schematically showing another example of the pressurizing device in which the plurality of pressurizing jigs are used to form the honeycomb bonded body.

Alternatively, as shown in FIG. 10, there may be used a pressurizing device 90 including a pressurizing jig 91 configured to pressurize, from all directions, all the quadrangular segments 20 and triangular segments 30 that appear in the circumferential surface 72 of the temporary assembly 71 from the circumferential direction of the temporary assembly 71 toward the center thereof, and including a plurality of pressurizer driving portions 94 capable of independently driving each of pressurizers 92 and quadrangular segment pressurizers 93 to pressurize the respective segments 20 and 30. In this case, the pressurizer driving portions 94 attached to the pressurizers 92 execute control so that at least a pair of pressurizers 92 abut on all the eight triangular segments 30 arranged at the outermost circumference to simultaneously pressurize the segments from two pressurizing directions perpendicular to each other.

At this time, the respective pressurizer driving portions 94 independently control each of the pressurizers 92 and the quadrangular segment pressurizers 93 to pressurize the segments in the same pressurizing direction (e.g., the first pressurizing direction PD1). Consequently, an amount of each of the triangular segments 30 and the quadrangular segments 20 to be pressurized is finely adjusted in pressurizing the segments. In consequence, a dimensional accuracy of the honeycomb bonded body 70 becomes suitable. It is to be noted that the pressurizing jig 91 including the plurality of pressurizer driving portions 94 is not limited to the example where the temporary assembly 71 is pressurized from all the directions as shown in FIG. 10, but in the pressurizing jig, guide portions 60 (see FIG. 4) may be provided in two directions to the temporary assembly 71. Here, in FIG. 10, the same constitutions as in FIG. 1, FIG. 4, FIG. 9 and others are denoted with the same reference numerals.

Hereinafter, description will be made as to examples of the manufacturing method of the honeycomb structure of the present invention, but the manufacturing method of the honeycomb structure of the present invention is not especially limited to these examples.

EXAMPLES

1. Preparation of Honeycomb Formed Body and Quadrangular Segment (Honeycomb Fired Body):

Silicon carbide powder and metal silicon powder were mixed at a mass ratio of 80:20 and this mixture was considered as a ceramic raw material. Then, the ceramic raw material was kneaded with a pore former, a forming aid and water, and a round pillar-shaped kneaded material was prepared with a vacuum pugmill. Here, a foamable resin was used as the pore former and methylcellulose was formed as the forming aid. To 100 parts by mass of the ceramic raw material, 2 parts by mass of pore former, 5 parts by mass of forming aid and 29 parts by mass of water were mixed, respectively.

The obtained round pillar-shaped kneaded material was formed in the form of a honeycomb by use of an extruder, dried by high frequency induction heating, and then dried at 120° C. for 5 hours by use of a hot air dryer, and both end faces were cut as much as a predetermined amount, thereby obtaining a quadrangular prismatic columnar honeycomb formed body. In the obtained honeycomb formed body, a thickness of partition walls was 310 µm, a cell density was 46.5 cells/cm$^2$ (300 cells/square inch), a bottom surface was a square of 35 mm×35 mm, and a length was 152 mm. 14 honeycomb formed bodies per example were prepared.

As to the obtained honeycomb formed body, plugging portions were formed at ends of cells so that opposite ends of adjacent cells were plugged and both end faces possessed a checkerboard pattern. In a plugging filler, a material similar to that of the honeycomb formed body was used. A depth of the plugging portion (the depth in a cell extending direction) was adjusted to 6 mm. The honeycomb formed body was plugged and then the plugged honeycomb formed body was dried at 120° C. for 5 hours by use of the hot air dryer.

Afterward, the honeycomb formed bodies were placed in an atmosphere furnace with a deodorizer in an air atmosphere, and a temperature was raised up to 450° C. for about 20 hours (particularly, the temperature was slowly raised in a range of 200 to 300° C. in which organic components were decomposed). Afterward, the honeycomb formed bodies were held at 450° C. for 5 hours, naturally cooled down to 100° C. in the furnace for 5 hours, and then degreased (degreased for 30 hours). Afterward, the honeycomb formed bodies were fired at about 1450° C. in an inert atmosphere of argon for 24 hours (main firing) (10 hours for the temperature raising, 4 hours for the holding, and 10 hours for the temperature lowering), to obtain quadrangular prismatic columnar honeycomb fired bodies each having a square bottom surface. In the obtained honeycomb fired bodies, partition walls were porous. An average pore diameter of the honeycomb fired bodies was 13 µm and a porosity was 41%.

The average pore diameter was a value measured with a mercury porosimeter and the porosity was a value measured by Archimedes' method.

2. Preparation of Triangular Segment (Triangular Segment Forming Step);

Details of a method of preparing triangular segments from the quadrangular segment (the honeycomb fired body) obtained by the above method have already been described, and are therefore omitted.

3. Formation of Honeycomb Bonded Body (Bonded Body Forming Step):

Details of a method of combining 12 quadrangular segments and 4 triangular segments obtained by the above method to construct a temporary assembly and then forming a honeycomb bonded body have already been described, and are therefore omitted. Additionally, in the present example, the respective triangular and quadrangular segments were pressurized toward a predetermined pressurizing direction with a force of 20 kPa to 100 kPa by use of a pressurizer controller.

Here, for a honeycomb bonded body of Example 1, a pressurizer to pressurize each of triangular segments arranged in four corners of a temporary assembly did not include a swinging mechanism (a slide mechanism), and a plurality of pressurizers and quadrangular segment pressurizers to pressurize the segments in the same pressurizing direction (e.g., a first pressurizing direction PD1 or the like) were integrally driven with the same pressurizer driving portion. In Example 2, differently from Example 1, a pressurizer included a swinging mechanism. Furthermore, in Example 3, a pressurizer did not include a swinging mechanism, and a plurality of pressurizers and quadrangular segment pressurizers to pressurize segments in the same pressurizing direction were respectively independently driven with a plurality of pressurizer driving portions. Table 1 mentioned below shows a summary of conditions of Examples 1 to 3 mentioned above.

TABLE 1

| | Swinging mechanism of pressurizer | Pressurizer driving portions | Width of bonding layer/mm | Evaluation |
|---|---|---|---|---|
| Example 1 | None | Integrally driven (see FIG. 9) | 1.9 | B |
| Example 2 | Present | Integrally driven (see FIG. 9) | 1.1 | A |
| Example 3 | None | Independently driven (see FIG. 10) | 1.3 | A |

Each of manufacturing methods of honeycomb structures of Examples 1 to 3 was evaluated based on whether or not a width of a bonding layer among respective triangular and quadrangular segments fell in a prescribed range.

Here, an example where the width of the bonding layer in the honeycomb bonded body is 0.5 mm or more and less than 1.5 mm is evaluated as "A", an example where the width is "0.3 mm or more and less than 0.5 mm" or "1.5 mm or more and less than 2.0 mm" is evaluated as "B", and an example other than these examples is evaluated as "C". When the width of the bonding layer is less than 0.3 mm, a buffering effect of each segment deteriorates, and when the width of the bonding layer is 2.0 mm or more, there is the fear that pressure loss of the honeycomb structure increases.

4. Measurement of Width of Bonding Layer:

The width of the bonding layer was measured by the following measuring method. That is, there is performed processing of allowing an image judgment system (e.g., "a CNC image measurement system NEXIV manufactured by Nikon Corporation" or the like) to recognize an image of each of both end faces of the obtained honeycomb bonded body, measuring widths of 12 points of the bonding layer (bonding widths) in each end face and averaging obtained values. It is to be noted that the number of the measurement points in the end face is 12 in total including 8 points of a circumferential portion and 4 points of a central portion. Table 1 shows the averaged values based on the measurements and the evaluation results.

It is seen from the above results shown in Table 1 that in the manufacturing method of the honeycomb structure of the present invention, it is possible to suitably prepare the honeycomb bonded body by use of the pressurizer having the triangular cross section and that it is possible to further stabilize the bonding width especially because the mechanism which swings (slides) the pressurizer in the direction perpendicular to the pressurizing direction is provided. It is further seen that also when the respective pressurizers and quadrangular segment pressurizers to pressurize the segments are independently driven by using a plurality of pressurizer driving portions, a suitable result can be obtained.

A manufacturing method of a honeycomb structure of the present invention can be utilized in manufacturing the honeycomb structure which can suitably be utilized as a carrier for a catalyst device or a filter which is used for an environmental measure, collection of a specific substance, or the like, in various fields of cars, chemistry, electric power, irons and steels, and others.

DESCRIPTION OF REFERENCE NUMERALS

10: honeycomb formed body, 11a: one end face, 11b: the other end face, 12: cell, 13: partition wall, 14: formed body cross section, 20: quadrangular segment, 21: quadrangular cross section, 22: segment side, 30: triangular segment, 31: triangular cross section, 32a: first side, 32b: second side, 32c: oblique side, 40 and 70: honeycomb bonded body, 41 and 71: temporary assembly, 41a: assembly bottom surface, 41b: assembly side surface, 42: bonding layer, 43: assembly cross section, 44: bonded body cross section, 45 and 72: circumferential surface, 50, 50a, 50b, 50c, 81 and 91: pressurizing jig, 51: pressurizing cross section, 52, 82 and 92: pressurizer, 52a: first pressurizer, 52b: second pressurizer, 52c: third pressurizer, 53, 84 and 94: pressurizer driving portion, 54: movement regulating portion, 55, 83 and 93: quadrangular segment pressurizer, 56: swinging mechanism portion, 60: guide portion, 61: bottom surface portion, 62: side surface portion, 80 and 90: pressurizing device, C1, C2, C3 and C4: corner, CA: central axis, DL: diagonal line, F1: first side surface, F2: second side surface, F3: oblique side surface, F4: segment side surface, GL: grinding line, P, P1, P2 and P3: pressurizing oblique side surface, PD: pressurizing direction, PD1: first pressurizing direction, PD2: second pressurizing direction, PD3: third pressurizing direction, PD4: fourth pressurizing direction, and SD: swinging direction.

What is claimed is:

1. A manufacturing method of a honeycomb structure comprising:
   a formed body forming step of extruding a forming raw material, to form a plurality of quadrangular prismatic columnar honeycomb formed bodies which have partition walls to define a plurality of cells forming through channels for a fluid and extending from one end face to the other end face and in which a formed body cross section perpendicular to a central axis is rectangular;

a firing step of firing the honeycomb formed bodies, to form a plurality of quadrangular prismatic-columnar quadrangular segments;

a triangular segment forming step of cutting parts of the formed quadrangular segments along a diagonal line in a quadrangular cross section perpendicular to the central axis and in parallel with the central axis, to form a triangular prismatic-columnar triangular segment which has a first side surface, a second side surface perpendicular to the first side surface, and an oblique side surface to couple side ends of the first side surface and the second side surface with each other and in which a triangular cross section perpendicular to the central axis is right-angled triangular;

a bonded body forming step of disposing the triangular segment in a corner so that the oblique side surface becomes an outermost circumference and so that the residual first and second side surfaces face segment side surfaces of the quadrangular segments, respectively, to construct a temporary assembly in which a plurality of triangular segments and the quadrangular segments are combined, and interposing a bonding layer between the triangular segment and the quadrangular segment and between the quadrangular segments, to form a honeycomb bonded body; and a circumference grinding step of drying the obtained honeycomb bonded body, and then grinding and processing a circumferential surface of the honeycomb bonded body, to manufacture the honeycomb structure having a desirable shape, wherein the bonded body forming step further comprises:

a pressurizing step of pressurizing the triangular segment from a circumferential direction of the temporary assembly toward a central direction thereof, by use of a pressurizing jig comprising a pressurizer which has a cross section having a shape analogous to that of the triangular cross section and a pressurizing oblique side surface abuttable on the oblique side surface, and a pressurizer driving portion which moves the pressurizer along a pressurizing direction perpendicular to the first side surface or the second side surface to pressurize the triangular segment in a state where the pressurizing oblique side surface abuts on the oblique side surface.

2. The manufacturing method of the honeycomb structure according to claim 1, wherein the pressurizing jig further comprises a movement regulating portion which abuts on the triangular segment and the quadrangular segment from a direction perpendicular to the pressurizing direction, to regulate movements of the triangular segment and the quadrangular segment from the central direction of the temporary assembly to the circumferential direction thereof.

3. The manufacturing method of the honeycomb structure according to claim 1, wherein in the pressurizing step, at least a pair of pressurizing jigs are used, the triangular segment is pressurized in a first pressurizing direction by a first pressurizer of one of the pressurizing jigs, and the triangular segment is pressurized in a second pressurizing direction perpendicular to the first pressurizing direction by a second pressurizer of the other pressurizing jig.

4. The manufacturing method of the honeycomb structure according to claim 1, wherein the pressurizing jig further comprises a swinging mechanism portion which swings the pressurizer in a direction perpendicular to the pressurizing direction.

5. The manufacturing method of the honeycomb structure according to claim 1, wherein the pressurizing jig comprises a plurality of pressurizer driving portions, to independently drive a plurality of pressurizers attached to the pressurizer driving portions, respectively.

* * * * *